United States Patent [19]

Honma et al.

[11] Patent Number: 4,766,170

[45] Date of Patent: Aug. 23, 1988

[54] HEAT CURING ORGANOPOLYSILOXANE COMPOSITION

[75] Inventors: Hiroshi Honma; Mitsuo Hamada; Hideki Kobayashi, all of Chiba, Japan

[73] Assignee: Toray Silicone Company, Ltd., Tokyo, Japan

[21] Appl. No.: 13,502

[22] Filed: Feb. 11, 1987

[30] Foreign Application Priority Data

Feb. 25, 1986 [JP] Japan .................................. 61-39726

[51] Int. Cl.$^4$ ...................... C08L 83/08; C08L 83/07
[52] U.S. Cl. .................................... 524/500; 524/588; 525/478
[58] Field of Search ................. 524/588, 500; 525/478

[56] References Cited

U.S. PATENT DOCUMENTS

| | | | |
|---|---|---|---|
| 3,652,475 | 3/1972 | Wada et al. | 260/29.1 B |
| 3,660,345 | 5/1972 | Bobear | 260/37 B |
| 3,671,480 | 6/1972 | Wada et al. | 260/29.1 SB |
| 4,539,357 | 9/1985 | Bobear | 524/267 |

Primary Examiner—C. Warren Ivy
Attorney, Agent, or Firm—Edward C. Elliot

[57] ABSTRACT

A silicone elastomer having improved fatigue resistance is obtained by heat-curing a composition consists essentially of an organopolysiloxane gum having vinyl endblocking, an organopolysiloxane gum having from 0.1 to 2.0 percent of the organic radicals present as alkenyl radicals, an organopolysiloxane fluid having from 10 to 75 percent of the radicals present as alkenyl radicals, an organohydrogenpolysiloxane having at least 2 silicon-bonded hydrogen radicals in each molecule, a specific silica filler, and an organoperoxide.

4 Claims, No Drawings

HEAT CURING ORGANOPOLYSILOXANE COMPOSITION

BACKGROUND OF THE INVENTION

1. Field of the Invention

The present invention relates to a heat-curing organopolysiloxane composition, and in particular to an organopolysiloxane composition which cures into a very durable and very fatigue-resistant silicone rubber.

2. BACKGROUND INFORMATION

Because silicone rubbers retain the properties of a rubbery elastomer over a range of temperatures, they are widely used as keyboards, valve packings, uniform-motion joint boots and electric wire coatings. However, compared with other organic rubbers, silicone rubbers generally have an inferior mechanical strength and, in particular, they are easily fatigued by the application of repeated deformation from the exterior.

Accordingly, in order to improve the aforementioned properties, silicone rubbers have been proposed in which organopolysiloxane with a low vinyl group content is blended with organopolysiloxane with a high vinyl group content. This improves the mechanical properties and particularly the tear strength. Also, silicone rubbers have been proposed in which organopolysiloxane with a low vinyl group content is blended with organopolysiloxane with a high vinyl group content and with organohydrogenpolysiloxane. This improves both the heat resistance and tear strength.

U.S. Pat. No. 3,652,475, issued Mar. 28, 1972, describes a heat curable elastomeric silicone composition which cures to yield a silicone rubber having a high tear strength. The composition consists of polydiorganosiloxane having a degree of polymerization of at least 3,000 and containing at most 0.3 mole percent of vinyl group containing siloxane units, polydiorganosiloxane having a degree of polymerization of at least 3,000 and containing from 5 to 20 mole percent of vinyl group containing siloxane units polydiorganosiloxane having a degree of polymerization of from 10 to 1,000 and containing from 5 to 90 mole percent vinyl group containing siloxane units, silica filler, and organic peroxide.

U.S. Pat. No. 3,671,480, issued June 20, 1972, describes a heat curable elastomeric silicone composition comprising a mixture of two polydiorganosiloxanes, each of which contains vinyl unsaturation, a silica filler, a polydiorganohydrogensiloxane and a platinum compound.

U.S. Pat. No. 3,660,345. issued May 2, 1972, describes organopolysiloxanes which are convertible to elastomers having high tear strength and resiliency. The compositions comprise either a two component blend of a vinyl containing organopolysiloxane gum having minor amounts of chemically combined siloxy units with at least one vinyl radical attached to silicon, and a vinylpolysiloxane having up to major amounts of chemically combined siloxy units with at least one vinyl radical attached to silicon, or a three component blend comprising an organopolysiloxane gum free of chemically combined siloxy units with at least one vinyl radical attached to silicon in combination with the aforementioned two component blend.

U.S. Pat. No. 4,539,357, issued Sept. 3, 1985, relates to a silicone elastomer having a high tear strength comprising a blend of vinyl-containing gums, a silica reinforcing filler, a hydride crosslinking agent, and a peroxide curing catalyst. One of ordinary skill in this art would recognize that the hydride crosslinking agent of this patent (Bobear '357) corresponds to the organohydrogen polysiloxane component (c) of the present invention. Bobear '357 teaches that the organohydrogen polysiloxane typically has a viscosity ranging from 10 to 1000 centipoises at 25° C.

However, while the aforementioned methods can provide silicone rubbers in which the mechanical property of tear strength is improved, they are not necessarily satisfactory with regard to the production of highly durable silicone rubbers with an excellent fatigue resistance, i.e., bending fatigue resistance and elongation fatigue resistance.

Various methods were examined by the present inventors in order to resolve the aforementioned problems of the prior art, and it was discovered that a silicone rubber, in which there is a localization in the distributed density of the crosslinking bonds of the organopolysiloxane gum forming the skeleton of the silicone rubber and which also is reinforced with a specific organopolysiloxane and a specific silica, has an excellent fatigue resistance as well as a high durability. The invention was developed based on this observation.

SUMMARY OF THE INVENTION

A heat-curing organopolysiloxane composition which cures to an elastomer having improved fatigue resistance has been developed. The composition consists essentially of an organopolysiloxane gum having vinyl endblocking, an organopolysiloxane gum having from 0.1 to 2.0 percent of the organic radicals present as alkenyl radicals an organopolysiloxane fluid having from 10 to 75 percent of the radicals present as alkenyl radicals, an organohydrogenpolysiloxane having at least 2 silicon-bonded hydrogen radicals in each molecule, a specific silica filler, and an organoperoxide.

An object of the present invention is to provide an organopolysiloxane composition which affords, by means of thermal curing, a silicone rubber with an excellent fatigue resistance and a high durability.

DESCRIPTION OF THE INVENTION

This invention relates to a heat-curing organopolysiloxane composition consisting essentially of (A) 100 parts by weight of organopolysiloxane gum with the general formula

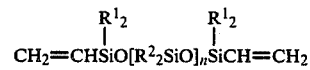

$$CH_2=CHSiO[R^2{}_2SiO]_nSiCH=CH_2$$

in which $R^1$ and $R^2$ are substituted or unsubstituted monovalent hydrocarbon groups, excluding alkenyl groups, and n is equal to or greater than 3,000 (B) 50 to 150 parts by weight of organopolysiloxane gum with the general formula

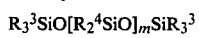

$$R_3{}^3SiO[R_2{}^4SiO]_mSiR_3{}^3$$

in which $R^3$ is a substituted or unsubstituted monovalent hydrocarbon group or the hydroxyl goup; $R^4$ is a substituted or unsubstituted monovalent hydrocarbon group, of which 0.1 to 2.0% is alkenyl group; and m is equal to or greatr than 3,000, (C) 0.5 to 10 parts by weight of organohydrogenpolysiloxane having at least 2 silicon-bonded hydrogen atoms in each molecule, (D) ultrafine silica powder with a specific surface area of at least 250 m²/g, at the rate of 20 to 50 parts by weight per 100 parts by weight of the total quantity of components (A) plus (B), (E) 0.1 to 5 parts by weight of organoperoxide, and (F) 1 to 50 weight parts organopolysiloxane with the general formula

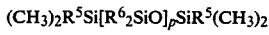

$(CH_3)_2R^5Si[R^6{}_2SiO]_pSiR^5(CH_3)_2$ in which $R^5$ is a hydroxyl group or methyl group; $R^6$ is a monovalent hydrocarbon group of which 10 to 75% is alkenyl group; and p is 5 to 100.

By way of explanation, the component (A) to be used in the present invention forms the skeleton of the cured silicone rubber. It is an organopolysiloxane gum with vinyl groups at both terminals, but which does not have side-chain alkenyl groups. In the aforementioned formula, $R^1$ and $R^2$ may or may not be identical, and consist of substituted or unsubstituted monovalent hydrocarbon groups, as exemplified by alkyl groups such as methyl, ethyl, and propyl; cycloalkyl groups such as cyclohexyl; aralkyl groups such as beta-phenylethyl; aryl groups such as phenyl; and these groups in which the hydrogen atom has been replaced by a cyano group. Alkenyl groups, such as vinyl and allyl, must not be present in $R^1$ or $R^2$ because such a presence by organoperoxide-activated alkenyl groups excessively increases the crosslinking density in the composition of the invention and, in particular, the distributed density of crosslinking bonds cannot be localized and the fatigue resistance is undesirably reduced. The average degree of polymerization n is equal to or greater than 3,000 and preferably equal to or less than 5,000. This corresponds to the use range for the organopolysiloxane gums used in typical heat-curing organopolysiloxane compositions. When this value is less than 3,000, satisfactory mechanical properties cannot be obtained and the workability upon mixing the ultrafine silica powder is reduced. Concrete examples of such organopolysiloxane gums are dimethylvinylsiloxy-terminated or methylphenylvinylsiloxy-terminated dimethylpolysiloxanes, diphenylpolysiloxanes and phenylmethylpolysiloxanes.

The component (B) to be used in the present invention is an organopolysiloxane gum having side-chain alkenyl groups. In the aforementioned formula, $R^3$ and $R^4$ may or may not be identical to each other. $R^3$ is a substituted or unsubstituted monovalent hydrocarbon group or the hydroxyl group. and $R^4$ is a substituted or unsubstituted monovalent hydrocarbon group, of which 0.1 to 2.0 percent is alkenyl group. These are exemplified by alkyl groups such as methyl ethyl and propyl; cycloalkyl groups such as cyclohexyl; aralkyl groups such as beta phenylethyl; aryl groups such as phenyl; alkenyl groups such as vinyl and allyl; and these groups in which hydrogen has been substituted by for example. the cyano group. At less than 0.1 mol percent alkenyl groups the crosslink density in the overall silicone rubber is excessively reduced and its mechanical strength is undesirably reduced. Exceeding 2.0 mol percent alkenyl groups is undesirable because this causes an excessive increase in the crosslinking density. and the mechanical strength in particular the tensile elongation, is again undesirably reduced. The terminal groups of this organopolysiloxane are not specifically restricted. The preferred alkenyl group is the vinyl group.

The organohydrogenpolysiloxane comprising component (C) in the present invention is an additive component which is necessary for increasing the fatigue resistance of the silicone rubber. It must contain at least 2 silicon-bonded hydrogen atoms in each molecule. While mainly linear or cyclic structures are used, slightly branched chain structures or moderately three-dimensional structures may be present.

The quantity of addition of this organohydrogenpolysiloxane is appropriately selected depending on the number of silicon-bonded hydrogen atoms present in the molecule and the object can be accomplished in the range of 0.5 to 10 parts by weight per 100 parts by weight of component (A).

The component (D) to be used in the present invention is as a reinforcing agent, the component essential for imparting mechanical properties to the silicone rubber; and in particular for improving the fatigue resistance of the silicone rubber by means of its combination with the above component (C). It must be an ultrafine silica powder with a surface area of at least 250 m²/g. In the present invention, the silicone rubber produced at below 250 m²/g has a significantly reduced fatigue resistance. Such ultrafine silica powder is exemplified by dry-method fumed silica, calcined silica and wet-method precipitated silica. Dry-method silica is preferred in the present invention because it provides a silicone rubber with an excellent fatigue resistance.

This component is to be blended at 20 to 50 parts by weight, and more preferably 30 to 40 parts by weight per 100 parts by weight of the combined quantity of components (A) plus (B). This is because of the following unique effect in the present invention: the fatigue resistance declines at below 20 parts by weight while the fatigue resistance also significantly declines at above 50 parts by weight.

The organoperoxide used as component (E) in the invention is exemplified by the known benzoyl peroxide, 2,4-dichlorobenzoyl peroxide, di-t-butyl peroxide, t-butylmonochlorobenzoyl peroxide and 2.5-dimethyl-2.5-di(t-butylperoxy)hexane. It is used in the range of 0.1 to 5 parts by weight per 100 parts by weight of component (A). This component can be dispersed into the usual silicone oils in advance to provide a paste which is then used for compounding.

The addition and blending of component (F), an organopolysiloxane oil with the general formula

$(CH_3)_2R^5Si[R^6SiO]_pSiR^5(CH_3)_2$ in which $R^5$ is a hydroxyl group or methyl group; $R^6$ is a monovalent hydrocarbon group; of which 10 to 75 percent is to be the alkenyl group; and p is 5 to 100 is also effective in further improving the performance of the composition of the invention and, in particular, in increasing its already high fatigue resistance.

In tne aforementioned formula, $R^5$ is a hydroxyl group or methyl group, and $R^6$ is a monovalent hydrocarbon group, of which 10 to 75 percent is to be the alkenyl group, and which is exemplified by alkyl groups such as methyl, ethyl and propyl; aryl groups such as phenyl; and alkenyl groups such as vinyl and allyl. At less than 10 percent alkenyl groups, the degree of localization of the distributed density of crosslinking bonds becomes low. Exceeding 75 percent alkenyl is undesirable because the crosslinking density becomes too high and the tensile elongation ratio is reduced. The quantity of alkenyl groups is preferably 20 to 60 percent in the present invention. The preferred alkenyl group is the vinyl group, Component (F) is to be blended in the range of 5 to 50 parts by weight per 100 parts by weight of component (A). The effect of the addition and blending of component (F) is not significant at below 5 parts by weight, while exceeding 50 parts by weight causes an excessive and undesirable increase in the crosslinking density in the overall silicone rubber. It is not clear why the fatigue resistance is increased by the addition and mixing of component (F), but component (F) is thought to act as a binder, which further strengthens crosslinking bonding between the organopolysiloxane gum constituting the skeleton of the silicone rubber, and so further localizes the distributed density of the crosslinks.

The composition of the invention can be easily produced by simply mixing components (A) to (E) or (A) to (F) with each other to homogeneity. Additives known in the art such as various inorganic fillers, for example, various silica powders, red iron oxide, cerium oxide, cerium hydroxide, fatty acid salts of cerium, fatty acid salts of iron, titanium oxide and carbon black, can be added, depending on the purpose, unless they adversely affect the characteristics of the object of the invention.

A composition of the invention produced as above has the characteristic that thermal curing affords a silicone rubber with an excellent fatigue resistance, i.e., bending resistance and elongation resistance. Exploiting these properties, it is suitably used as a silicone rubber composition for keyboards, bellows boots and valve packings, which are subject to repeated deformation.

The following examples are included for illustrative purposes only and should not be construed as limiting the invention, which is properly set forth in the appended claims.

EXAMPLE 1

A comparative composition was prepared by mixing 100 weight parts dimethylvinylsiloxy-terminated organopolysiloxane gum with an average degree of polymerization of 7,000 and composed of $(CH_3)_2SiO$ units; 70 weight parts trimethylsiloxyterminated organopolysiloxane gum with an average degree of polymerization of 8,000 andcomposed of 99.8 mol percent $(CH_3)_2SiO$ units and 0.2 mol percent $(CH_3)(CH_2=CH)SiO$ units; 30 weight parts dimethylhydroxysiloxy-terminated organopolysiloxane gum (gum C) with an average degree of polymerization of 8,000 and composed of 98.7 mol percent $(CH_3)_2SiO$ units and 1.3 mol percent $(CH_3)(CH_2=CH)SiO$ units; and, as a plasticizer, 10 weight parts dimethylpolysiloxane oil with an average degree of polymerization of 3 and composed of $(CH_3)_2SiO$ units, in a kneader mixer. Then 45 weight parts fumed silica with a surface of 380 m²/g (Aerosil 380 from Nippon Aerosil Co., Ltd.) was added, this was mixed and kneaded to homogeneity and then heated at 150° C. for 2 hours to remove the volatiles. This afforded a base compound in the form of an organopolysiloxane composition, Four weight parts methylhydrogenpolysiloxane with a viscosity at 25° C. of 10 cS and 0.5 weight parts 2,5-dimethyl-2,5-di-(t-butylperoxy)hexane were added to this composition, followed by mixing on a 2-roll to homogeneity. This composition does not include the organopolysiloxane having from 10 to 75 percent alkenyl groups (F). The obtained composition was compression molded at 170° C./30 kg/cm² for 10 minutes to obtain a 2mm thick sheet, The physical properties and fatigue resistance of this sheet were measured by JIS K-6301. The fatigue resistance was measured using the bending fatigue resistance of paragraph 15 of JIS K-6301 (that is, the sample was bent without being notched and the life is designated as the number of reciprocating cycles until the occurrence of cracking in the flexed region of the sample) and by the following uniform elongation fatigue testing method in accordance with the aforementioned method. These results are reported in Table 1.

Uniform Elongation Fatigue Testing Method

A number 3 dumbbell (thickness, 2 mm) test piece is punched from the silicone rubber sheet. This test piece is installed in the De Mattia tester shown in paragraph 15 of JIS K-6301, and then subjected to reciprocating motion at 300 10/cycles per minute. The distance between the gripping tools is 75.0 mm at the maximum and 37 mm at the minimum. The number of reciprocating cycles to rupture the test piece is reported as the uniform elongation fatigue life. In this test method the test piece held between the gripping tools is repeatedly elongated between 0 and 100%.

In a comparison example, an organopolysiloxane composition was produced by the same method as above, but omitting the organohydrogenpolysiloxane component. The physical properties and fatigue resistance of the silicone rubber sheet of this composition were measured as above, and these results are also reported in Table 1. According to Table 1, a silicone rubber with a sharply improved fatigue resistance was produced using organohydrogenpolysiloxane as an ingredient in the composition.

TABLE 1

|  |  | Comparison Invention | Comparison Example |
|---|---|---|---|
| organohydrogen-polysiloxane | weight parts | 4 | none |
| hardness | shore A | 58 | 57 |
| tensile strength | kg/cm² | 93 | 88 |
| elongation | percent | 470 | 460 |
| tear strength | kg/cm | 53 | 50 |
| 100% modulus | kg/cm² | 30 | 28 |
| fatigue resistance |  |  |  |
| uniform elongation life | $10^4 \times$ cycles | 153 | 95 |
| bending life | $10^4 \times$ cycles | 2300 | 1200 |

EXAMPLE 2

A composition was prepared by mixing 100 weight parts dimethylvinylsiloxy-terminated organopolysiloxane gum with an average degree of polymerization of 7,000 and composed of $(CH_3)_2SiO$ units 70 weight parts trimethylsiloxy-terminated organopolysiloxane gum with an average degree of polymerization 7 of 8,000 and composed of 9.8 mol percent $(CH_3)_2SiO$ units and 0.2 mol percent $(CH_3)(CH_2=CH)SiO$ units; 30 weight parts dimethylhydroxysiloxy-terminated organopolysiloxane gum with an average degree of polymerization of 8,000 and composed of 98,7 mol percent $(CH_3)_2SiO$ units and 1.3 mol percent $(CH_3)(CH_2=CH)SiO$ units; 10 weight parts dimethylhydroxysiloxy-terminated organopolyxiloxane oil with an average degree of polymerization of 15 and composed of $(CH_3)(CH_2=CH)SiO$ units; and, as a plasticizer, 5 weight parts dimethylpolysiloxane oil with an average degree of polymerization of 3 and composed of $(CH_3)_2SiO$ units, in a kneader mixer. To this was added 35 weight parts fumed silica with a surface area of 300 m²/g (Aerosil 300 from Nippon Aerosil Co., Ltd.), followed by mixing and kneading to homogeneity and then heating at 150° C. for 2 hours to obtain an organopolysiloxane composition base compound. Four weight parts, methylhydrogenpolysiloxane with a viscosity at 25° C. of 10 cS and 0.5 weight parts 2,5-dimethyl-2,5di(t-butylperoxy)hexane were added to this composition, followed by mixing to homogeneity using a 2-roll. The obtained composition was compression molded at 170° C./30 kg/cm² for 10 minutes to give a 2 mm thick sheet. The physical properties and fatigue resistance of this sheet were measured by the methods of Example 1. The results are reported in Table 2.

For comparison, an organopolysiloxane composition was produced by the above method but using a fumed silica with a surface area of 200 m²/g (Aerosil 200 from Nippon Aerosil Co,, Ltd.) instead of the fumed silica with a surface area of 300 m²/g, The physical properties and fatigue resistance of the silicone rubber sheet obtained by curing said composition by the same method as above were measured by the same methods as above. These results are also reported in Table 2. According to Table 2, the silicone rubber using the fumed silica with a surface area of 200 m²/g suffered from a significant decline in its fatigue resistance, although it had general physical properties and a tear strength similar to those of the composition of the invention.

TABLE 2

| | | Present Invention | Comparison Example |
|---|---|---|---|
| silica surface area | m²/g | 300 | 200 |
| hardness | Shore A | 57 | 56 |
| tensile strength | kg/cm² | 78 | 75 |
| elongation | percent | 420 | 370 |
| tear strength | kg/cm | 47 | 47 |
| 100% modulus | kg/cm² | 30 | 28 |
| fatigue resistance | | | |
| uniform elongation life | 10⁴ × cycles | 400 | 208 |

EXAMPLE 3

An organopolysiloxane composition was prepared as described in Example 2, with the exception that the fumed silica with a surface area of 380 m²/g from Example 1 was used instead of the fumed silica with a surface area of 300 m²/g which was used in the organopolysiloxane composition of Example 2. The general physical properties of the silicone rubber sheet obtained as the cured product from this organopolysiloxane composition were measured according to the methods in Examples 1 and 2. The results are reported in Table 3, For comparison, the general physical properties and fatigue resistance were measured on a silicone rubber sheet produced as above, but using the aforementioned composition containing fumed silica with a surface area of 200 m²/g which had been treated with hexamethyldisilazane instead of the fumed silica with a surface area of 380 m²/g. These results are reported comparatively in Table 3.

TABLE 3

| | | Present Invention | Comparison Example |
|---|---|---|---|
| silica surface area | m²/g | 380 | 200 |
| hardness | Shore A | 57 | 55 |
| tensile strength | kg/cm² | 83 | 88 |
| elongation | percent | 400 | 600 |
| tear strength | kg/cm | 50 | 58 |
| 100% modulus | kg/cm² | 30 | 25 |
| fatigue resistance | | | |
| uniform elongation life | 10⁴ × cycles | 570 | 130 |
| bending life | 10⁴ × cycles | 3071 | 710 |

A comparison of the properties of the first comparative example of Example 1 and the properties of the present invention of Example 3 shows the effect of the addition of the organopolysiloxane having 50 mol percent vinyl groups (ingredient F). Both the uniform elongation life and the bending life are improved by the addition of (F), as the rest of the ingredients are the same.

Because the organopolysiloxane composition of the present invention thermally cures into a rubber with an excellent fatigue resistance, i.e., bending fatigue resistance and uniform elongation fatigue resistance, it is extremely useful for various silicone rubber components which are subjected to repeated deformation.

That which is claimed is:

1. Heat-curing organopolysiloxane composition consisting essentially of
    (A) 100 parts by weight of organopolysiloxane gum with the general formula

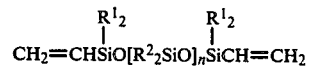

in which $R^1$ and $R^2$ are selected from the group consisting of monovalent hydrocarbon groups excluding alkenyl groups, and cyanoalkyl groups, and n is equal to or greater than 3,000.
    (B) 50 to 150 parts by weight of organopolysiloxane gum with the general formula

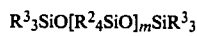

in which $R^3$ is selected from the group consisting of monovalent hydrocarbon group, cyanoalkyl group, and the hydroxyl group; $R^4$ is selected from the group consisting of monovalent hydrocarbon group, and cyanoalkyl group, of which 0.1 to 0.2 percent of the radicals attached to the silicon atoms are alkenyl group; and m is equal to or greater than 3,000.
    (C) 0.5 to 10 parts by weight of organohydrogenpolysiloxane having at least 2 silicon-bonded hydrogen atoms in each molecule, having a viscosity ranging from 10 to 1000 centipoise at 25° C. surface area of at least 250 m²/g, at the rate of 20 to 50 parts by weight per 100 parts by weight of the total quantity of components (A) plus (B),
    (E) 0.1 to 5 parts by weight of organoperoxide, and
    (F) 1 to 50 parts by weight of organopolysiloxane oil with the general formula

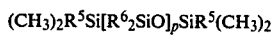

in which $R^5$ is a hydroxyl group or methyl group; $R^6$ is a monovalent hydrocarbon group, of which 10 to 75 percent of the radicals attached to the silicon atoms are alkenyl group; and p is 5 to 100.

2. Heat-curing silicone rubber composition described in claim 1, characterized in that the ultrafine silica powder is fumed silica.

3. Composition described in claim 1, wherein $R^5$ is the hydroxyl group.

4. Composition described in claim 1, wherein the alkenyl group of (B) and of (F) is a vinyl.

* * * * *

UNITED STATES PATENT AND TRADEMARK OFFICE
CERTIFICATE OF CORRECTION

PATENT NO. : 4,766,170

DATED : August 23, 1988

INVENTOR(S) : Hiroshi Honma, Mitsuo Hamada, and Hideki Koboyashi

It is certified that error appears in the above-identified patent and that said Letters Patent is hereby corrected as shown below:

At Claim 1, Part B, remove the formula "$R^3_3SiO(R^2_4SiO)_m SiR^3_3$"

and replace with -- $R^3_3SiO[R^4_2SiO]_m SiR^3_3$ --

Signed and Sealed this

Twenty-seventh Day of December, 1988

Attest:

DONALD J. QUIGG

Attesting Officer

Commissioner of Patents and Trademarks